March 13, 1928.

C. B. TONEY, JR 1,662,725

PISTON

Filed Jan. 27, 1927

Inventor
C. B. Toney Jr.
by Hazard and Miller
Attorneys

Patented Mar. 13, 1928.

1,662,725

UNITED STATES PATENT OFFICE.

CHARLES BARFIELD TONEY, JR., OF LOS ANGELES, CALIFORNIA.

PISTON.

Application filed January 27, 1927. Serial No. 163,910.

My invention is a piston particularly adapted for what are termed mud pumps used in well drilling.

An object of my invention is the construction of a piston having a resilient packing, such packing being positively forced against the cylinder in which the piston reciprocates by by-passing some of the fluid pumped by the piston.

A particular object of my invention is the construction of a piston for use in a mud pump in pumping a solution of water and clay forming a mud, for use in well drilling. The hose or pipe connection leading from the pump has a by-pass which is connected to a hollow piston rod. The piston is provided with opposite heads and a resilient packing, such as rubber, between the heads, the hollow piston communicating with a space behind the packing and thereby expanding such packing against the cylinder.

Another object of my invention is utilizing a resilient expansible packing under pressure to form a seal between the parts forming a piston and the piston rod to which they are connected, thus preventing the mud from working its way along the piston rod which, in practice, has been found to soon loosen the piston and the rod.

My invention will be more readily understood from the following description and drawings, in which.

Figure 1:
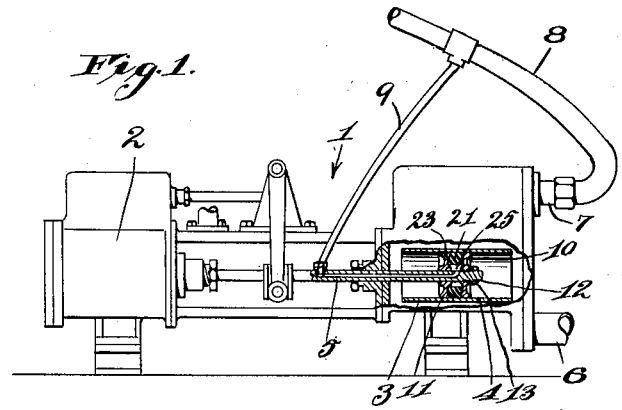
Figure 1 is a side elevation, partly broken away, of a pump having my piston installed therein.

In the drawings the pump is designated generally by the numeral 1, having a power end 2, and a pump cylinder 3 in which operates my piston, designated generally by the numeral 4, the piston being connected to the hollow piston rod 5. Such rod is operated by the source of power 2 to reciprocate the piston in the usual manner.

The inlet to the pump is designated by the numeral 6 and the outlet by the numeral 7. This outlet is connected to a pipe 8 or hose which in well drilling leads to a drilling mechanism having a tube for conveying mud to the bottom of the well. A by-pass pipe or hose 9 connects from the pipe 8 to the hollow piston rod. This pipe or hose is flexible so that it may accommodate the reciprocation of the piston rod.

Figure 2:
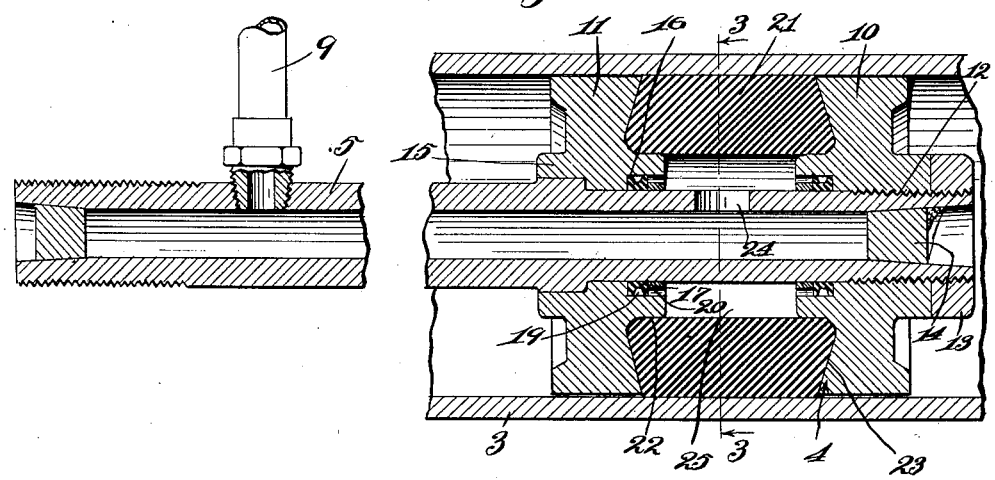
Figure 2 is a longitudinal section through a cylinder, through the piston, and the piston rod.
Figure 3:
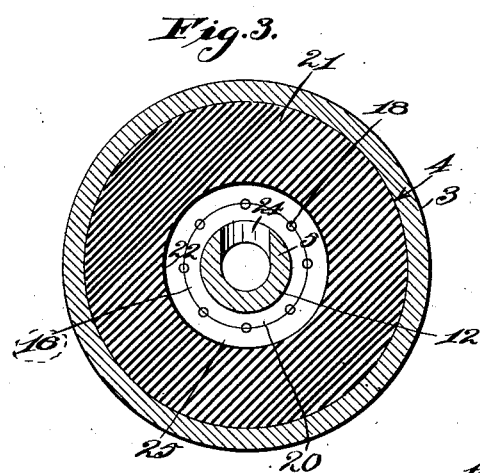
Figure 3 is a transverse section through the piston on the line 3—3 of Fig. 2.

Referring particularly to Figs. 2 and 3, the piston has front and back heads 10 and 11. The head 10 has a screw threaded connection 12 with the end of the piston rod and is held in place by a nut 13. The end of the hollow piston rod is closed by a plug 14. The inner head 11 fits aganst a shoulder 15 on the piston rod and is preferably a tight pressed fit. Each of the heads has an annular recess 16 in which is fitted a rubber ring 17. This ring has a series of holes 18 therethrough, leading to the groove 19, so that such rings may be expanded as hereunder described. The resilient packing rings, preferably made of rubber, are held in place by a ring 20 fitting tight on the piston rod.

The main packing of the piston comprises a resilient packing ring 21, preferably formed of rubber, this being seated on cylindrical walls 22 of each of the piston heads and being confined between the inner walls 23 which converge as they extend radially outwardly from the piston rod. The hollow piston rod has one or more ports 24 leading from such hollow rod to the annular space 25 inside the picking 21.

The manner of operation of my piston is substantially as follows:

The piston is reciprocated in the cylinder in any suitable manner and when it is filled with mud this rod is forced through the discharge pipe 8 and part of it is by-passed through the flexible hose 9 to the hollow piston rod and passing through the port 24 seals the annular space 25, thus forcing the rubber packing 21 tightly against the walls of the cylinder. This forms a seal between the piston and the cylinder preventing the mud from passing from one side to the other of the piston.

The mud under pressure in the hollow space 25 also forces its way through the openings or apertures 18 into the groove 19 of the resilient packing rings 17 and expands such rings forming a tight seal between the piston heads and the connecting rod and thus preventing the mud from working its way along such rod. The mud in the space or chamber 25 is maintained at a high pressure, this being substantially equal to the pressure at which it is forced out of the pump.

It will thus be seen that my piston has an effective seal against the cylinder and also that the heads of the piston are sealed off by expanded resilient packing at the piston rod preventing the mud or like fluid being pumped from working its way along the piston rod.

Various changes may be made in the principles of my invention without departing from the spirit thereof, as set forth in the description, drawings and claims.

I claim:

1. In the art described, the combination of a cylinder, a piston having a resilient packing thereon, a hollow piston rod, there being a chamber between the packing and the rod, ports through the rod to said chamber, a discharge pipe operatively connected to the cylinder, and means to by-pass some of the fluid pumped from such discharge pipe to the hollow piston rod, such fluid expanding the packing against the cylinder.

2. In the art described, a pump having a cylinder with inlet and discharge passages, a piston having a pair of heads with resilient packing therebetween, a hollow piston rod connected to the heads, there being a chamber between the packing and the rod, with a port in the rod to said chamber, a pipe connected to the discharge passage, and a flexible tubular connection from said pipe to the hollow piston rod to by-pass some of the fluid pumped into the chamber to expand the packing.

3. A pump comprising in combination a cylinder having an inlet and a discharge, a piston having a pair of heads, a hollow piston rod to which said heads are connected, each head having a cylindrical wall, a resilient packing ring seated on said wall, there being a chamber between the ring and the piston rod, with a port through the rod to said chamber, and means forming a flexible tubular connection from the discharge to the hollow piston to by-pass part of the fluid pumped to the said chamber to expand the packing.

4. A pump, as claimed in claim 3, expansible resilient packing rings between each head and the piston rod, and openings from the chamber into said rings to allow expansion of said rings between the heads and the piston rod.

5. A pump comprising in combination a cylinder having an inlet and a discharge, a piston having a pair of heads secured to a hollow piston rod, the heads having cylindrical walls and inner walls converging radially outwardly from the piston rod, a resilient packing ring seated on the cylindrical walls and confined between the convergent walls, there being a chamber between said packing and the piston rod, a port in the rod to said chamber, a discharge pipe connected to the discharge, and a flexible by-pass pipe connecting said pipe and the hollow piston rod to by-pass some of the fluid pumped into the said chamber to expand the said packing.

6. A pump, as claimed in claim 5, each of the heads having an annular recess adjacent the rod, a resilient packing ring therein having a peripheral groove, and a series of holes through the ring to said groove, thereby connecting the chamber to the groove to allow passage of the fluid from the chamber to the groove to expand each of the rings between the head and the piston rod.

7. A piston having a pair of heads connected to a hollow piston rod, a resilient packing between the heads, there being a chamber between the packing and the rod, a port through the rod to the chamber, each of the heads having an annular recess adjacent the rod with a resilient ring fitted therein, said ring having a peripheral groove with a series of holes through each ring to the groove in the ring, thereby connecting the groove and the chamber whereby when the chamber is filled with a fluid the fluid fills the grooves and expands the rings against the heads and the rod.

In testimony whereof I have signed my name to this specification.

CHARLES BARFIELD TONEY, Jr.